United States Patent

Mroczkowski et al.

Patent Number: 5,157,244
Date of Patent: Oct. 20, 1992

[54] SMART KEY SYSTEM

[75] Inventors: Robert S. Mroczkowski, Lititz, Pa.; Leon T. Ritchie, Clearwater, Fla.

[73] Assignee: AMP Incorporated, Harrisburg, Pa.

[21] Appl. No.: 452,179

[22] Filed: Dec. 19, 1989

[51] Int. Cl.$^5$ .......................... G06K 7/06; G06K 7/08; G06K 19/06; H01R 29/00

[52] U.S. Cl. ........................ 235/441; 235/451; 235/492; 439/68

[58] Field of Search ............ 235/441, 492, 493, 449, 235/451, 380; 439/676, 68, 59; 361/399

[56] References Cited

U.S. PATENT DOCUMENTS

| | | | |
|---|---|---|---|
| 4,079,883 | 3/1978 | Calder | 235/441 |
| 4,210,376 | 7/1980 | Hughes et al. | 339/17 LC |
| 4,217,024 | 8/1980 | Aldridge et al. | 439/70 |
| 4,284,864 | 8/1981 | Crow et al. | 200/153 |
| 4,416,497 | 11/1983 | Brandsness et al. | 439/67 |
| 4,499,371 | 2/1985 | Rose | 235/441 |
| 4,532,419 | 7/1985 | Takeda | 235/492 |
| 4,602,351 | 7/1986 | Shimamura et al. | 365/52 |
| 4,621,190 | 11/1986 | Saito et al. | 235/492 |
| 4,621,884 | 11/1986 | Berkebile, Jr. et al. | 439/68 |
| 4,634,847 | 1/1987 | Jürgen | 235/451 |
| 4,653,822 | 3/1987 | Kanaza | 439/68 |
| 4,656,346 | 4/1987 | Drexler | 235/487 |
| 4,661,691 | 4/1987 | Halpern | 235/492 |
| 4,675,516 | 6/1987 | Guion | 235/441 |
| 4,676,571 | 6/1987 | Petersen et al. | 439/261 |
| 4,680,731 | 7/1987 | Izumi et al. | 364/900 |
| 4,686,358 | 8/1987 | Seckinger et al. | 235/492 |
| 4,697,073 | 9/1987 | Hara | 235/487 |
| 4,714,980 | 12/1987 | Hara | 361/395 |
| 4,715,820 | 12/1987 | Andrews, Jr. et al. | 439/59 |
| 4,722,700 | 2/1988 | Kohn et al. | 439/629 |
| 4,727,246 | 2/1988 | Hara et al. | 235/488 |
| 4,731,645 | 3/1988 | Parmentier et al. | 357/80 |
| 4,746,392 | 5/1988 | Hoppe | 156/244.12 |
| 4,754,319 | 6/1988 | Saito et al. | 357/72 |
| 4,754,418 | 6/1988 | Hara | 364/708 |
| 4,780,603 | 10/1988 | Hamada | 235/492 |
| 4,780,604 | 10/1988 | Hasegawa et al. | 235/492 |
| 4,798,946 | 1/1989 | Fujii et al. | 235/492 |
| 4,818,853 | 4/1989 | Ohta et al. | 235/492 |
| 4,820,910 | 4/1989 | Higo et al. | 235/441 |
| 4,843,226 | 6/1989 | Kato et al. | 235/492 |
| 4,864,116 | 9/1989 | Banjo et al. | 235/492 |
| 4,907,990 | 3/1990 | Bertho et al. | 439/682 |
| 4,910,394 | 3/1990 | Ohta | 235/492 |
| 4,924,076 | 5/1990 | Kitamura | 235/492 |
| 5,016,086 | 5/1991 | Inoue et al. | 235/492 |
| 5,069,641 | 12/1991 | Sakamoto et al. | 439/676 |

FOREIGN PATENT DOCUMENTS 59-36387  2/1984  Japan .

OTHER PUBLICATIONS

"Dynamic Contact Resistance Properties of Copper Alloys" by D. Gyurina (1979).

Primary Examiner—John W. Shepperd
Assistant Examiner—Christopher R. Glembocki

[57] ABSTRACT

A system for handling variable digital information comprising a key having an active integrated circuit component with leads extending therefrom, a battery for powering the component, unplated leads extending from the component to both the battery and to one edge of the key, and a container for sealing the component, battery and leads except at the edge of the container; and a receptacle having a plurality of unplated leads couplable at their inboard ends to electronic machinery and couplable at their outboard ends to the leads at the edge of the container.

8 Claims, 12 Drawing Sheets

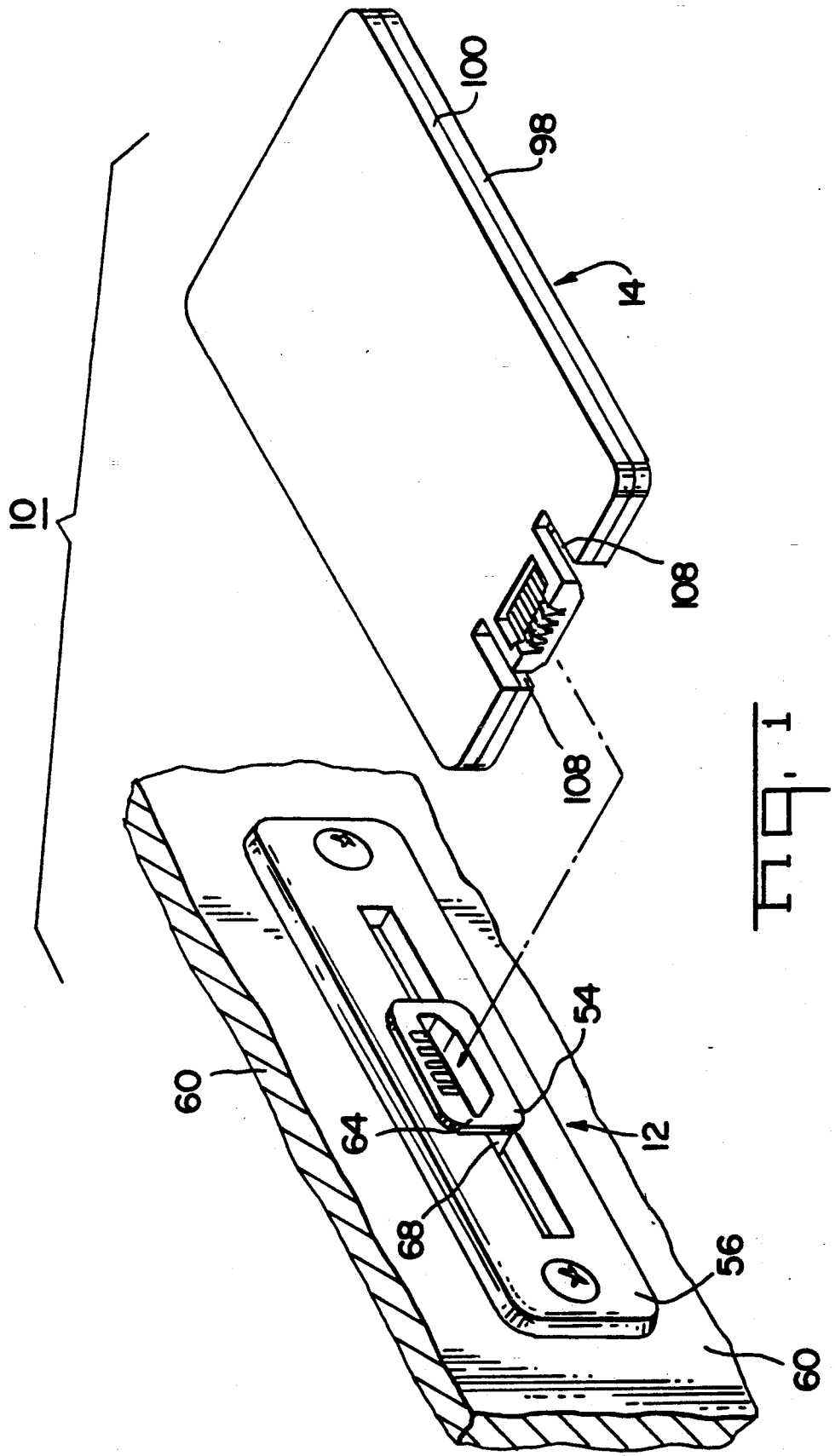

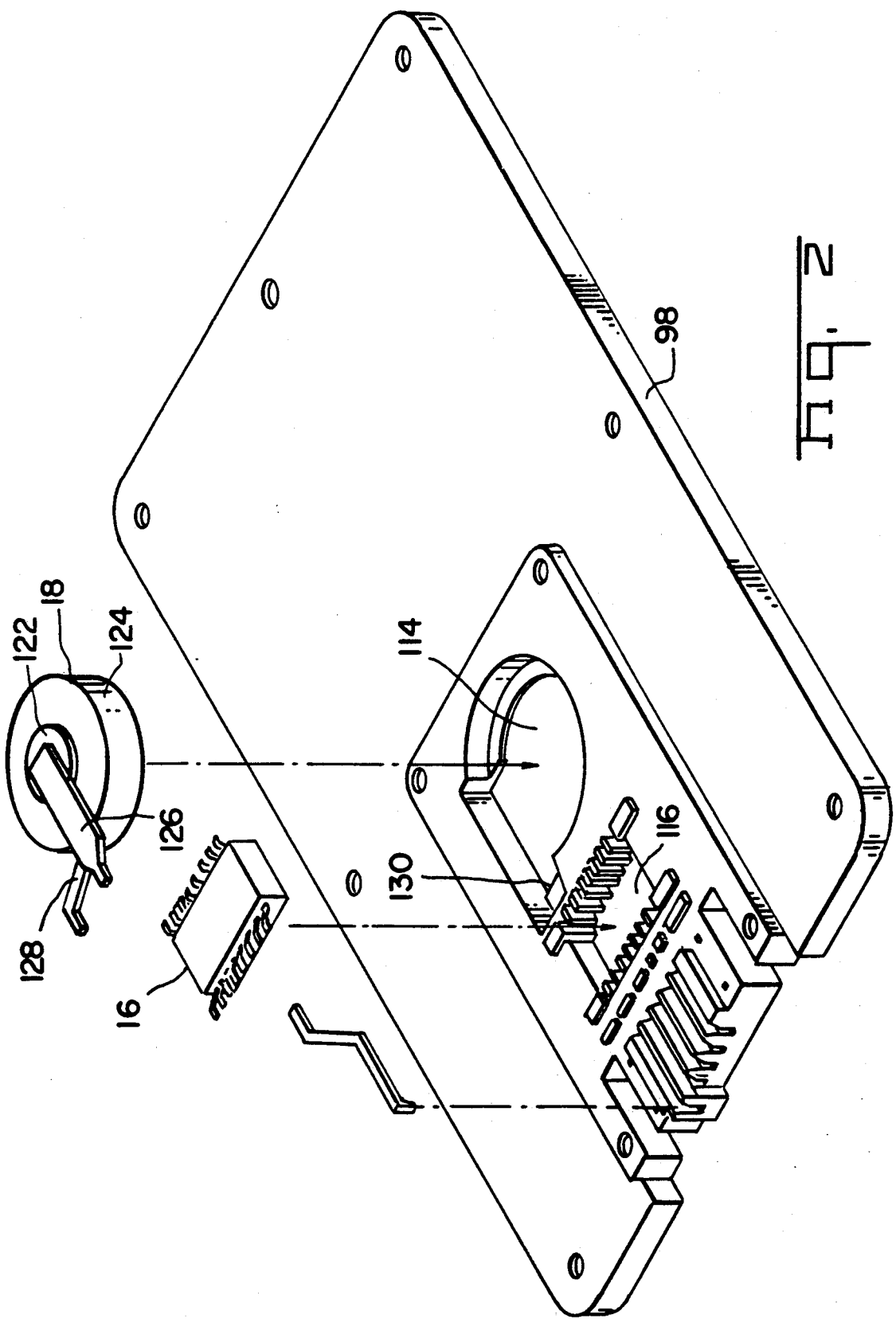

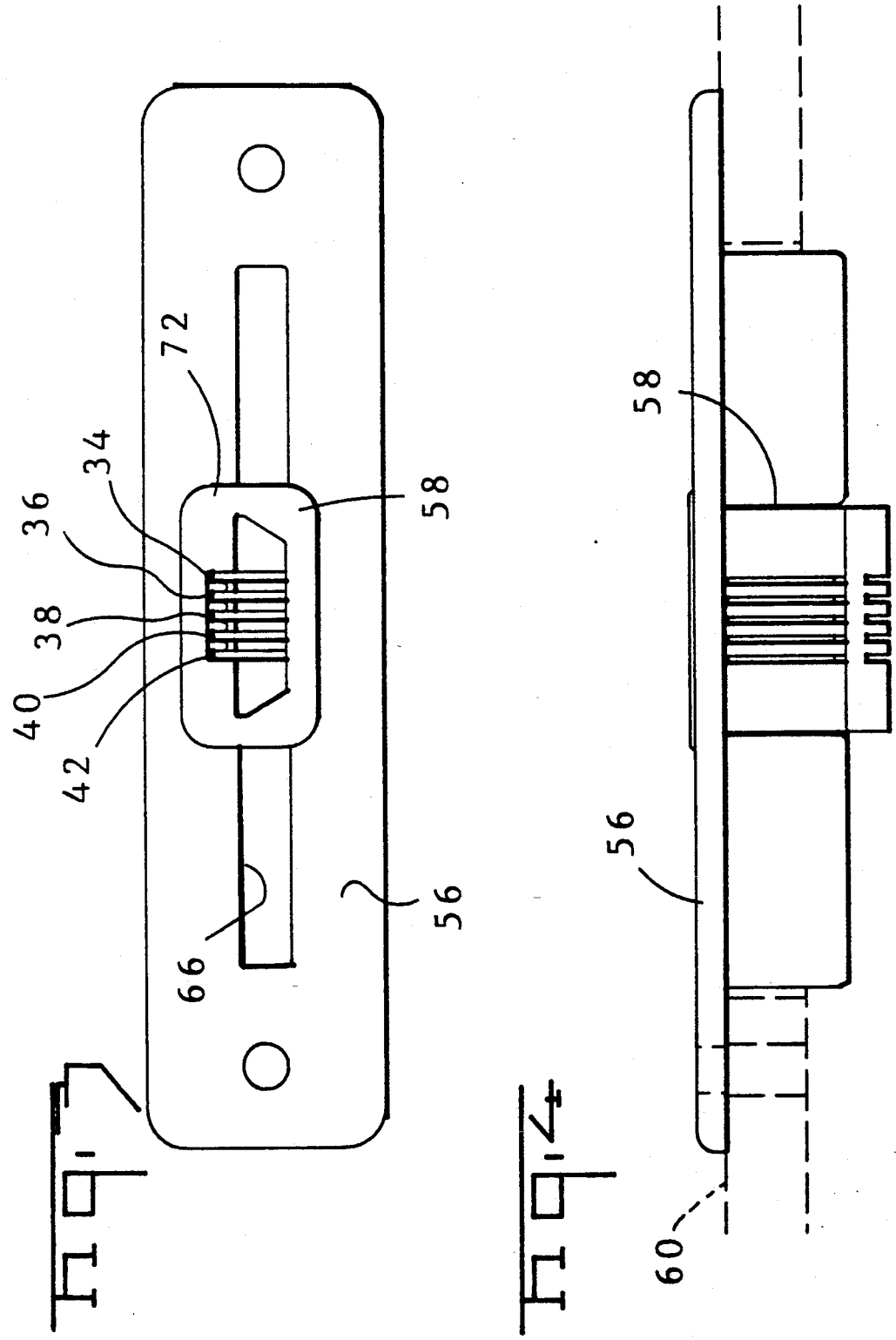

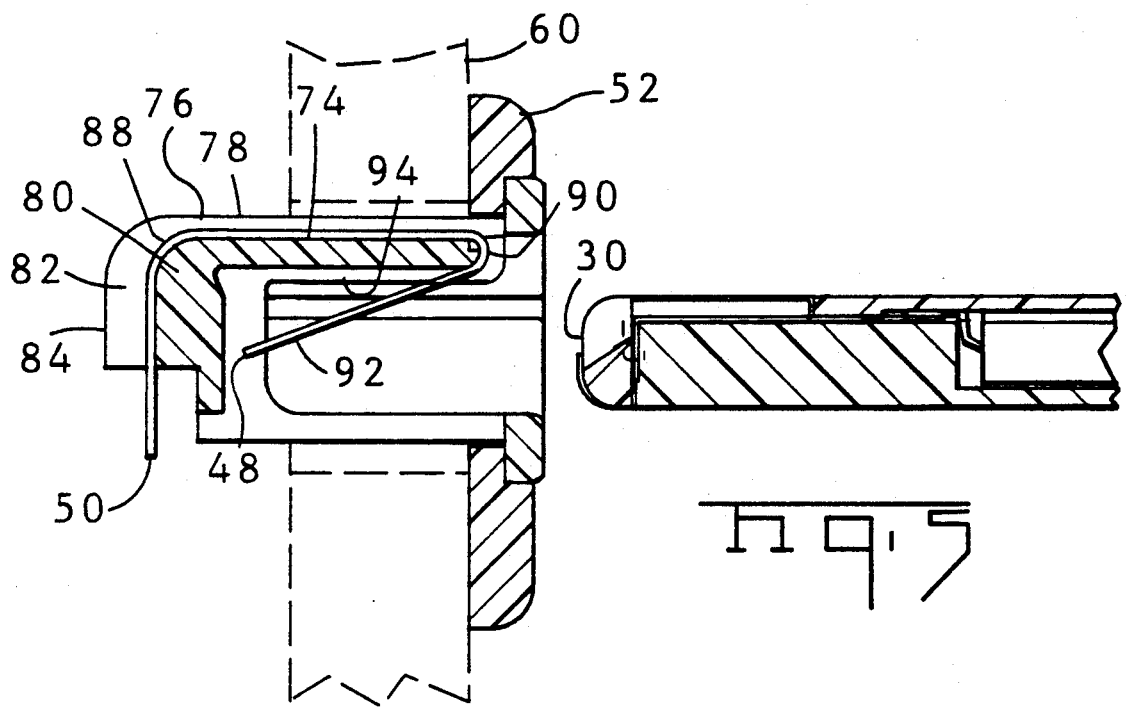
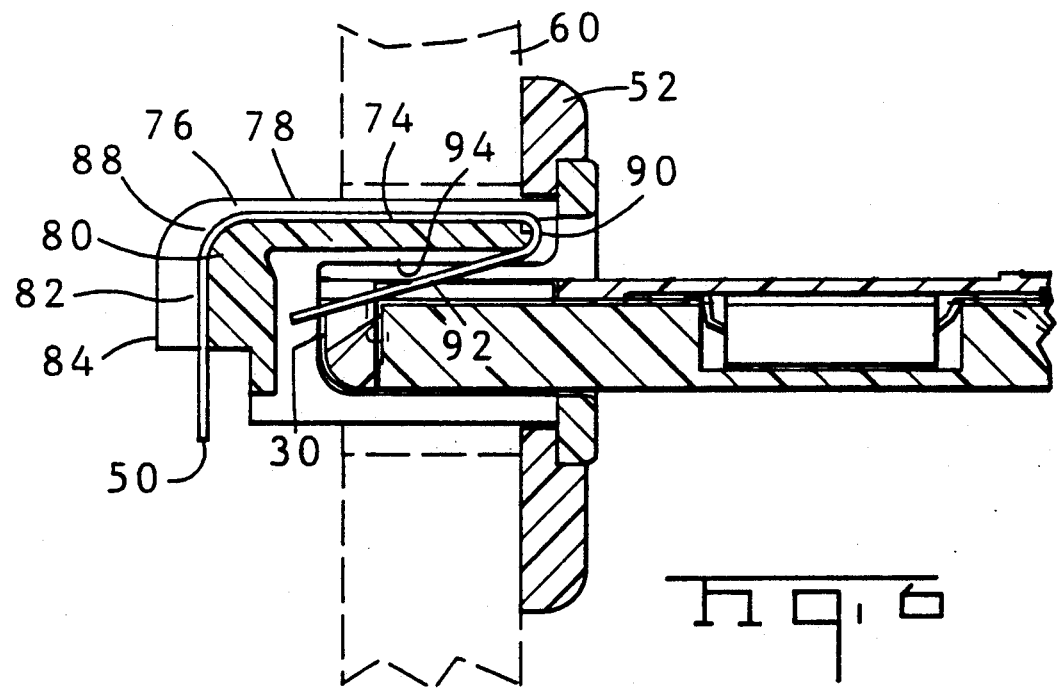

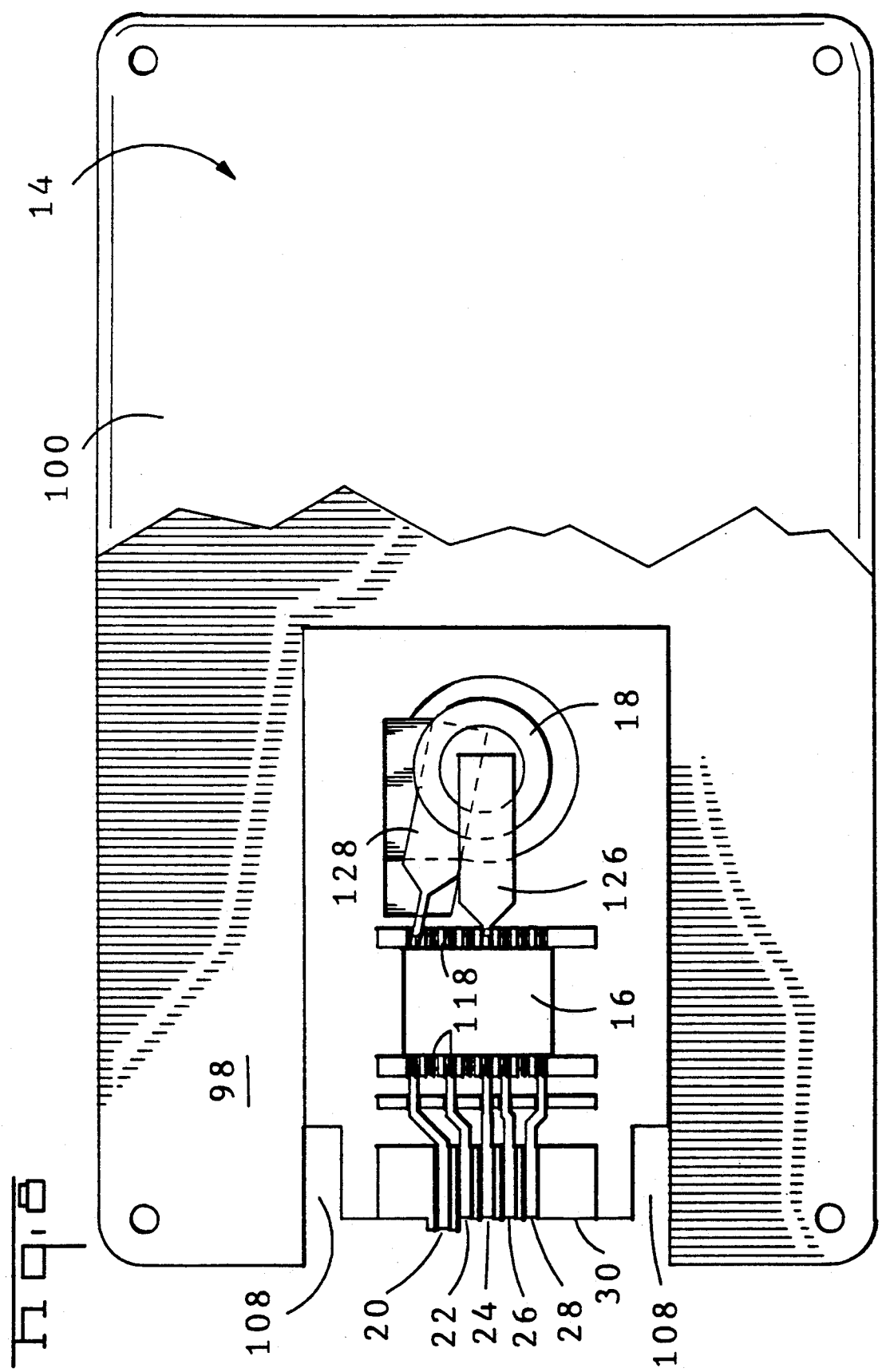

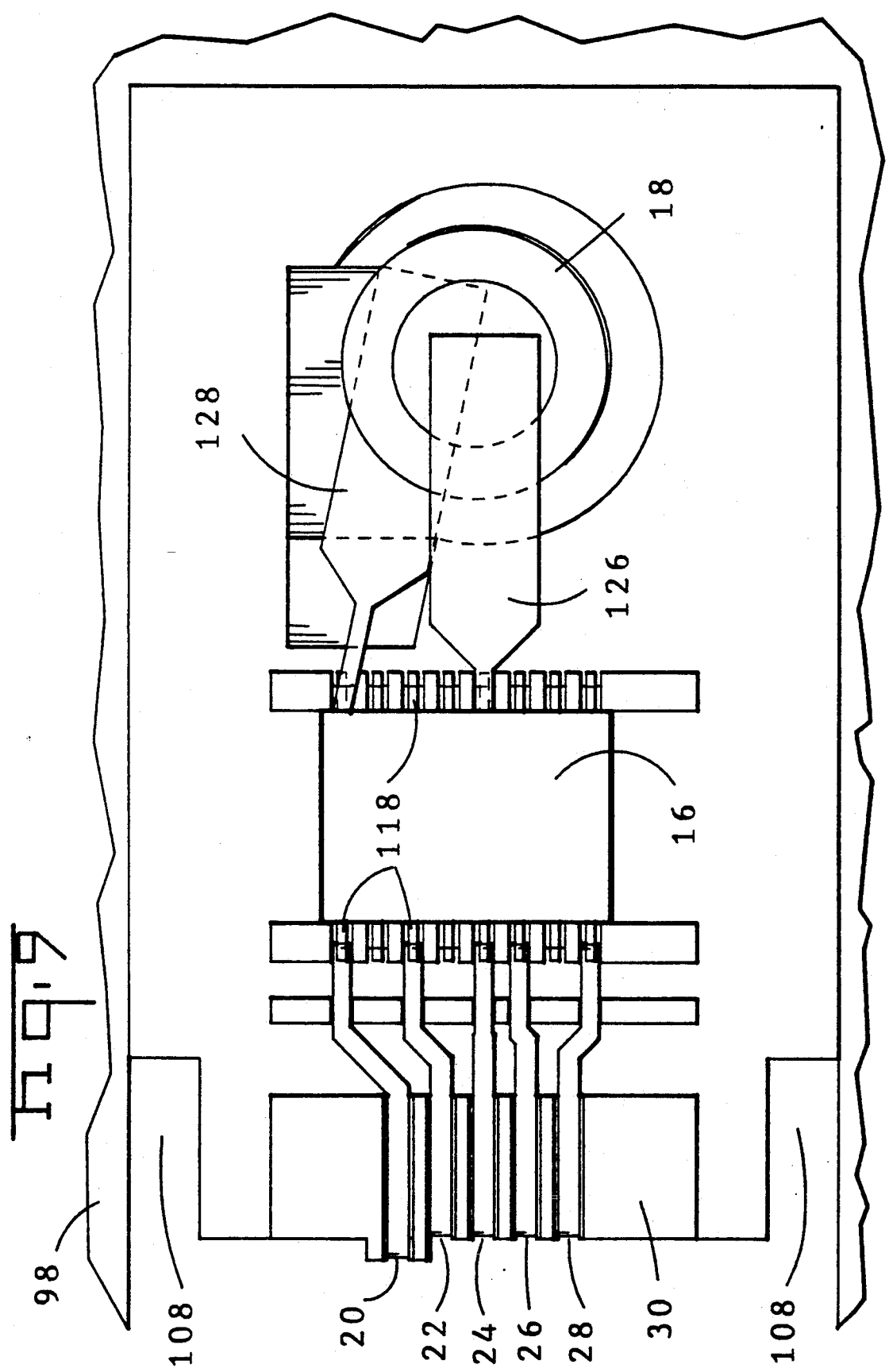

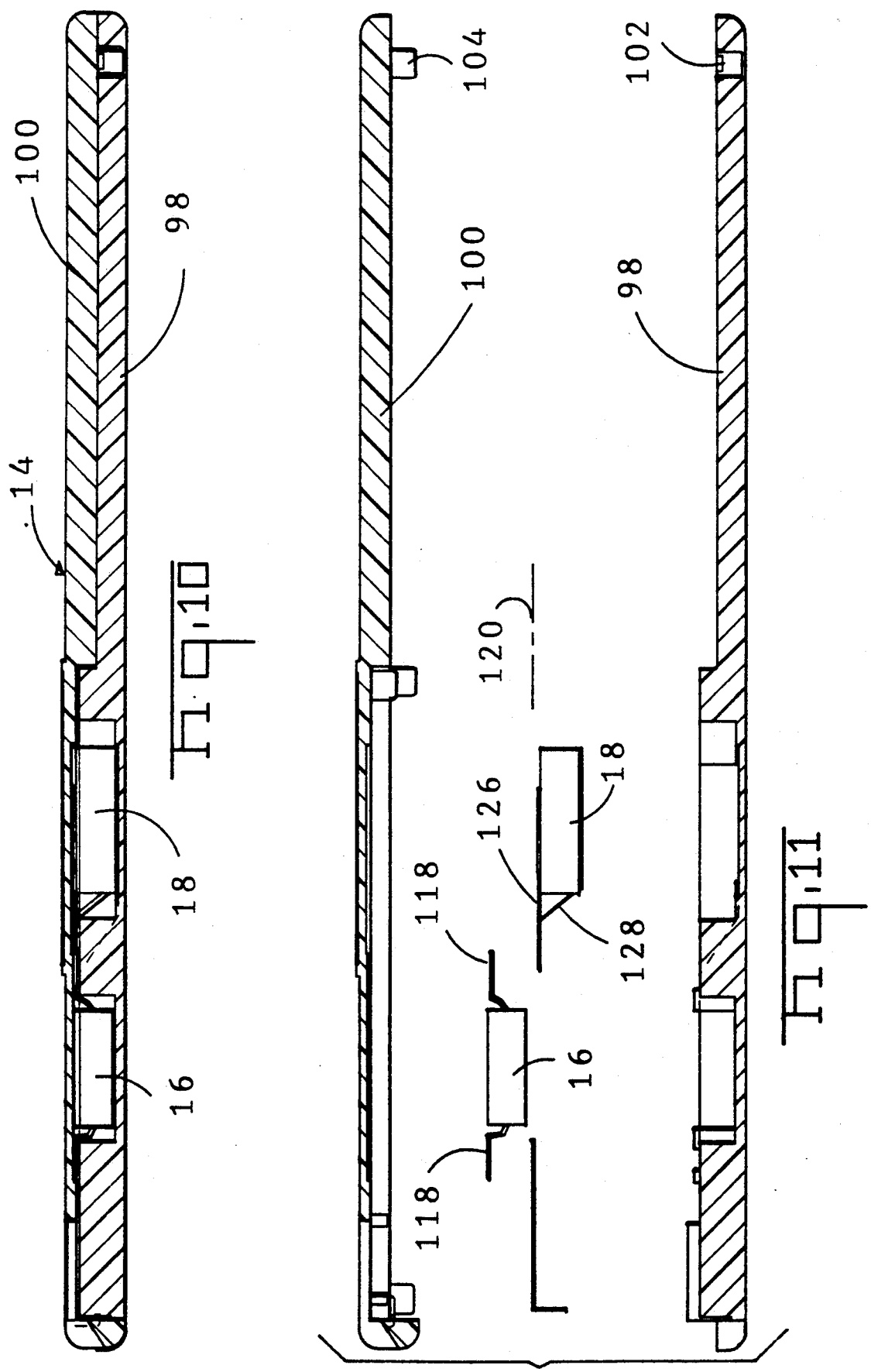

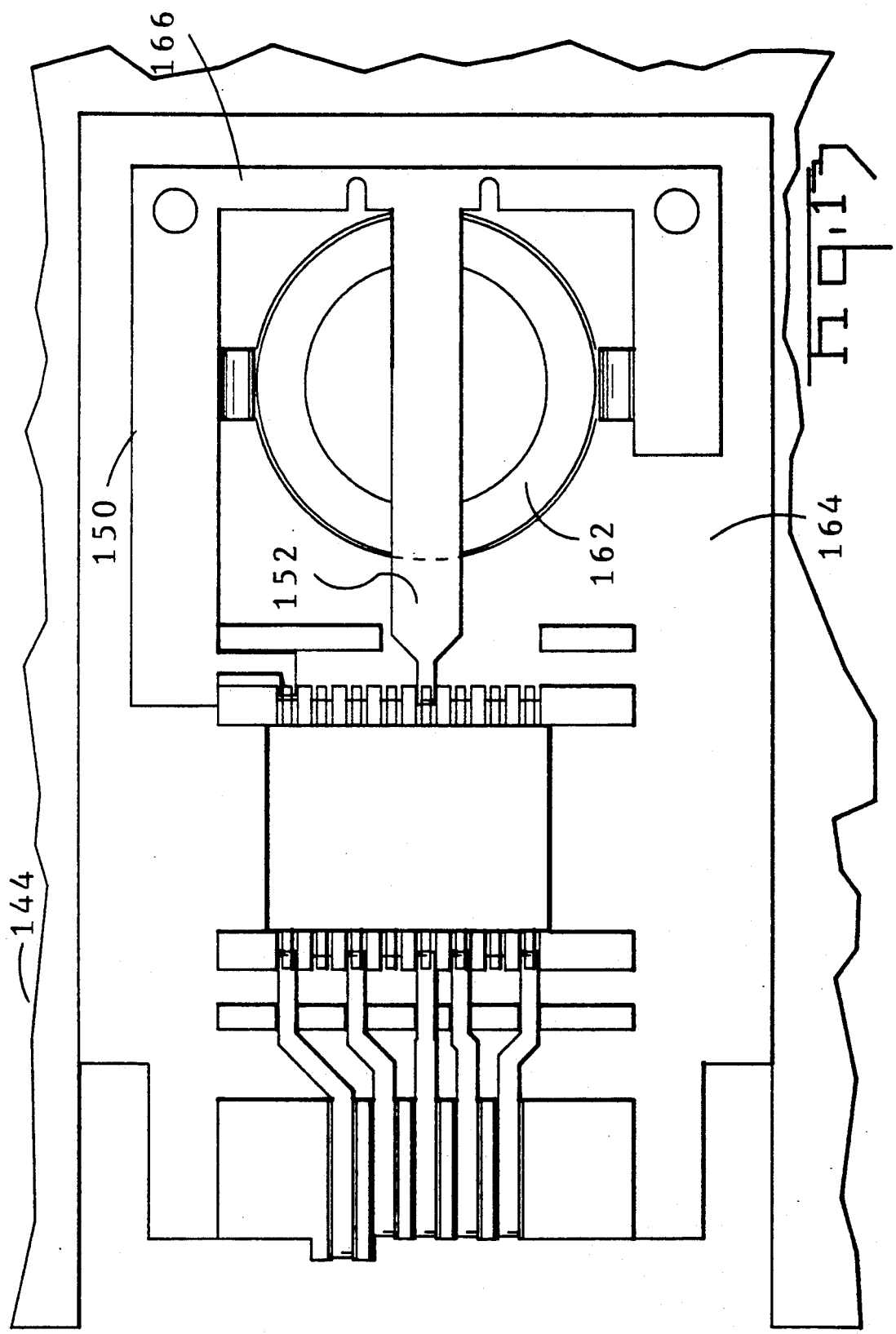

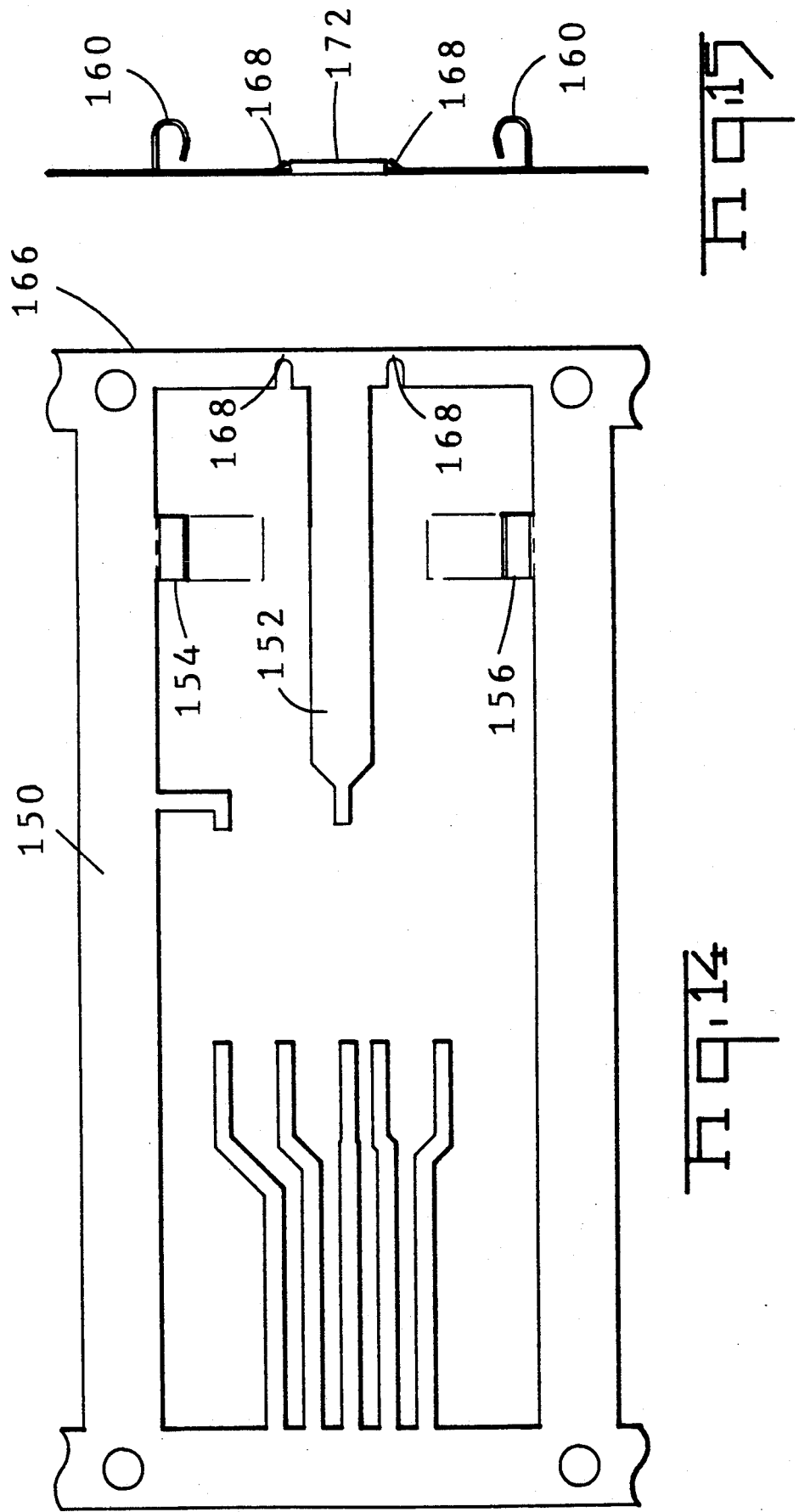

SMART KEY SYSTEM

BACKGROUND OF THE INVENTION

This invention relates to smart key systems and, more particularly, to a system comprising a receptacle with unplated leads and a cooperable key, the key having an integrated circuit component, unplated leads from the component to an edge of the key and a battery for powering the component.

DESCRIPTION OF THE BACKGROUND ART

Credit cards are an accepted part of life around the world. Credit cards have letters and numbers thereon for identifying the owner and for the proper charging of purchased goods or services. The more conventional credit cards have their identifying information raised from the remainder of the card. Transfer of such raised information from the card is effected by pressure through carbon or encapsulated paper. More modern credit cards have their identifying information as fixed electronic data in magnetic form embedded in the card for being scanned by an electronic machine. Such information exists within the card in read-only form. Magnetic cards may be used for other applications such as opening a lock or making a bank withdrawal.

A relatively recent advancement in the art is the smart credit card or key which contains a computer chip as an active integrated circuit component with exposed leads for reading and/or being read. Unlike more conventional cards, smart keys have the added capability to alter the digital information in the component.

The use of the smart key is just beginning to gain acceptance. The information within a smart key may be used for any function of any prior art credit card. It may also be used for a wide variety of other functions such as effecting more complex commercial or bank transactions, becoming part of an active electronic circuit, operating a machine, paying for cable TV usage, etc.

Known smart keys, however, whether in commercial use or simply disclosed in the literature, are somewhat limited because of their short life, unreliability and high cost of manufacture. Known systems of separable parts having contacts which couple and uncouple, as for example printed circuit boards and telephone jacks, are characterized by a relatively short life since their contacts fail to maintain adequate reliability over high numbers of insertions and withdrawals which had not been previously envisioned. The reliability of the contacts of known systems is also less than desirable for smart keys because of contaminants or other adverse environmental conditions not faced by known systems. Known systems employing separable contacts are designed for long life, limited cycle usages. Their contacts are seldom uncoupled. Smart keys function in an opposite manner. Being normally uncoupled, they encounter conditions previously not experienced by conventional contacts.

Various approaches are disclosed in the literature to improve couplable contacts. By way of example, note U.S. Pat. No. 4,210,376 to Hughes,. U.S. Pat. No. 4,676,571 to Petersen, and U.S. Pat. No. 4,780,603 to Hamada. These patents relate to receptacles or sockets for receiving contacts of a key or the like or for otherwise establishing electrical contacts between two members movable with respect to each other.

U.S. Pat. No. 4,754,418 to Hara discloses a credit key having an integrated circuit component and a power source and having exposed contacts for being read. The device is in combination with a calculator.

Castrucci discloses a key with exposed edge contacts, the key having an integrated circuit component and leads for reading or altering the information on the key.

A wide variety of additional keys with integrated circuit components and leads for being read are disclosed in U.S. Pat. No. 4,532,419 to Takeda; U.S. Pat. No. 4,697,073 to Hara; U.S. Pat. No. 4,714,980 to Hara; U.S. Pat. No. 4,727,246 to Hara et al; U.S. Pat. No. 4,731,645 to Parmentier; U.S. Pat. No. 4,746,392 to Hoppe and U.S. Pat. No. 4,754,319 to Saito. All of these patents feature a thick key composed of multiple, encompassing layers. Lastly, attention is drawn to U.S. Pat. No. 4,680,731 to Izumi and U.S. Pat. No. 4,656,346 to Tressler. These patents disclose a thick cartridge-like element having readable edge contacts and a data key for being read by optical mechanisms.

As illustrated by the great number of prior patents and known commercial smart keys, efforts are continuously being made in an attempt to design and fabricate smart keys more efficiently, conveniently, reliably and economically. None of these previous efforts, however, provides the benefits attendant with the present invention. Additionally, prior techniques do not suggest the present inventive combination of component elements as disclosed and claimed herein. The present invention achieves its intended purposes, objectives and advantages over the prior art devices through a new, useful and unobvious combination of component elements, which is simple to use, with the utilization of a minimum number of functioning parts, at a reasonable cost to manufacture, and by employing only readily available materials.

Therefore, it is an object of this invention to provide an improved system comprising a receptacle with unplated leads and a cooperable key, the key having an integrated circuit component, leads unplated from the component to an edge of the key and a battery for powering the component.

It is another object of this invention to manufacture smart keys with the contacts between the active integrated circuit component, battery and leads in a common plane for more efficient manufacturability and cost effectiveness.

It is another object of this invention to employ unplated materials as the contacts in mating electrical components whereby higher normal forces may function to clean the contacts during mating and unmating.

It is another object of this invention to separate the electrical and resilient functions of the leads of an edge key receptacle for extending its effectiveness and life.

Lastly, it is a further object of the invention to render smart key systems, key and receptacle, more efficient, reliable and longer lived, and more readily manufactured.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring "to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiments shown in the attached drawings. For the purpose of summarizing the invention, the invention may be incorporated into an improved system for handling variable digital information comprising a key having an active integrated circuit component with leads extending therefrom, a battery for powering the component, leads extending from the component to the battery and unplated portions of the leads extending to one edge of the key, and a container for sealing the component, battery and leads except at the edge of the container; and a receptacle having a plurality of unplated leads couplable at their inboard ends to electronic machinery and couplable at their outboard ends to the leads at the edge of the container. The edge leads of the key, as well as the contacts between the battery and the component, are in a common plane. The leads are fabricated of an unplated material with self-limiting corrosive properties whereby the wiping action resulting from insertion and removal of the key with respect to the receptacle will remove corrosion to thereby insure electrical coupling between the leads.

Further, the invention may be incorporated into a smart key for receiving and supporting digital information comprising an active integrated circuit component; a battery for powering the component; leads extending between the component and both the edge of a key and the battery; and a container for sealing the components, battery and leads of the key except for a portion of the leads at the edge of the key. The key is formed of only two, similarly shaped, body portions, and includes wells in one of the body portions for receiving the component and battery. The contact points between the leads of the component, battery and leads are in a common plane at the interface of the two body portions. The leads at the edge of the key are unplated and fabricated of an alloy having at least 93% copper. In the preferred embodiment, the alloy includes aluminum, silicon and cobalt. The leads of both the key and receptacle are preferably fabricated of an alloy containing at least 93.0% copper, 2.5 to 3.5% aluminum, 1.5 to 2.1% silicone and 2.5 to 0.55% cobalt.

In addition, the invention may be incorporated into a receptacle for receiving a smart key capable of reading, being read and varying the digital information of the smart key, the receptacle comprising a plurality of resilient, unplated electrical leads couplable at their interior ends to electronic machinery and at their external ends adapted to receive in a predetermined orientation leads at the edge of the smart key and electrically insulating support means for retaining the receptacle leads separated one from the other. The leads of the receptacle are of a solid, unplated, resilient, copper-based alloy which exhibits self-limiting corrosion. The receptacle further includes resilient means on the side of the receptacle leads remote from the smart key for resiliently urging such contacts into contact with the leads at the edge of the smart key.

Lastly, the present invention may be incorporated into a system comprising a key having electrical element means and a plurality of leads extending therefrom to the edge of the key and a container for sealing the element means except for the leads at the edge of the key; and a receptacle having a plurality of unplated, resilient electrical contacts couplable at their interior ends to electronic machinery and at their exterior ends adapted to receive the leads of the key and exert a normal force of about 200 grams thereon per lead.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiments may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a perspective illustration of a system including a smart key and a receptacle fabricated in accordance with the principles of the present invention.

FIG. 2 is an exploded perspective illustration of the key of FIG. 1.

FIG. 3 is a front elevational view of the receptacle shown in FIG. 1.

FIG. 4 is a plan view of the receptacle shown in FIG. 3.

FIGS. 5 and 6 are sectional views taken along lines 5—5 of FIG. 4 showing the receptacle, first with the key removed and then with the key inserted.

FIG. 8 is a plan view of the key shown in FIGS. 1 and 2 with parts removed to show certain internal construction.

FIG. 9 is a plan view similar to FIG. 8 but with the electrical components enlarged.

FIG. 10 is a side elevational view of the key substantially as shown in FIG. 8.

FIG. 11 is the key shown in FIG. 10 but in an exploded view.

FIG. 13 is a plan view similar to FIG. 9 but of a modified embodiment of the present invention.

FIG. 14 is a plan view of the lead frame for the key shown in FIG. 13.

FIG. 15 is an end elevational view of the lead frame shown in FIG. 14.

DETAILED DESCRIPTION OF THE INVENTION

The System

Figure 16:
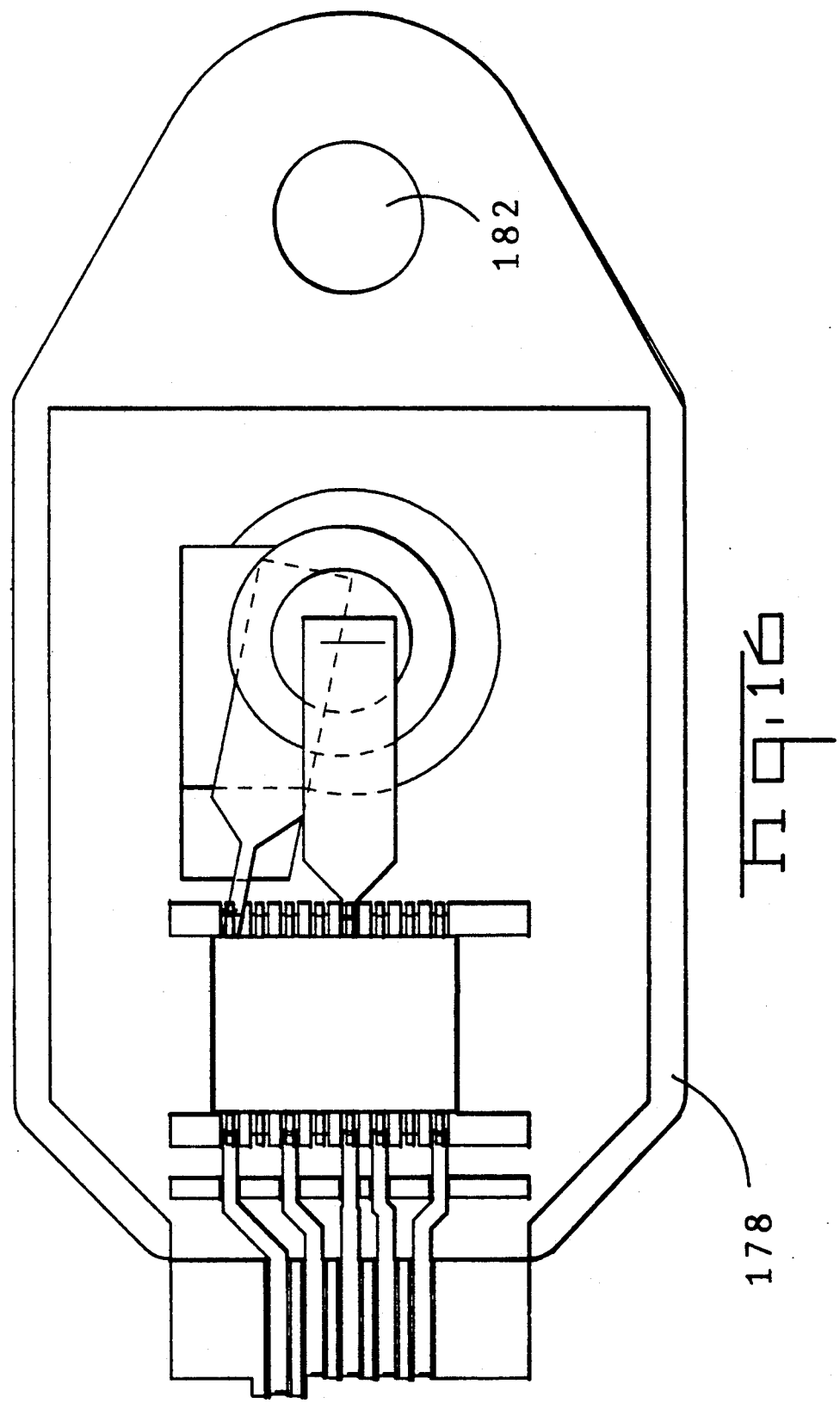
FIG. 16 is a plan view of the key with an alternate embodiment of the encasing mechanism. Similar referenced characters refer to similar parts throughout the several Figures.

With reference to FIG. 1, there is shown the system 10, which includes a receptacle assembly 12 and a key 14, constructed in accordance with the principles of the primary embodiment of the present invention. The key 14 is formed as a flat member which can take any peripheral shape as can be seen by comparing the card-like rectangular member of FIG. 1 with the key-shaped member of FIG. 16.

The key 14 includes a chip or other active integrated circuit component 16 and a battery 18 for powering the component 16. The key 14 also includes leads 20, 22, 24, 26 and 28 coupling the component 16 and battery 18. It extends from the component to one edge 30 of the key for reading or being read.

The receptacle 12 is an interface component between the key and an electronic machine, not shown. The receptacle has exposed electrical leads 34, 36, 38, 40 and 42 at its external or outboard end 46 for being contacted by the leads of the key 14 for reading, being read as well as the altering of the digital information in the component. The leads of the receptacle are resilient at their outboard ends 48 for being contacted by, and establishing electrical contact with, the leads of the key 14. The leads of the receptacle are coupled at their internal or inboard ends 50 to electrical elements of any type of cooperable electronic machine, not shown, of which it forms a part.

The Receptacle

As can be seen more particularly in FIGS. 3 through 6, the receptacle is actually an assembly 12 formed of the receptacle 54 and a peripheral plate 56. The plate has end holes 58 for being screwed or otherwise coupled to an opening in an electronic machine, only a portion of the cover 60 being shown. The plate 56 as well as the receptacle 54 are fabricated of an electrically insulating material for supporting the electrical leads. The plate 56 has a central opening 64 bounded by laterally spaced recesses 66. Vertical spacers 68 separate the central opening 64 and the lateral recesses 66. The receptacle 54 and face plate 56 are press fit together and coupled to form an assembly 12 which is secured to the electronic machine.

The lateral recesses 66 and spacers 68 are for properly positioning the front edge 30 of the key 14 within the receptacle assembly 12. This assures that the key 14 is received therein in proper orientation so that the leads of the key 14 mechanically and electrically couple with the leads of the receptacle 54. The receptacle 54 has a trapezoidal configuration for matingly receiving the key 14 which also has a trapezoidal configuration. This insures that the key is not inserted upside down.

The receptacle 54 itself has a peripheral exterior face 72 with an integrally formed internal, horizontal, upper plate 74 formed with longitudinal grooves 76 and spacers 78 for separating the receptacle leads. The leads are equal in number to the grooves 76 and are each electrically and mechanically separated by the spacers 78. An integrally formed internal, vertical rear plate 80 is also formed with grooves 82 and spacers 84 as extensions of those of the upper plate 74.

The receptacle leads themselves are bent ninety (90) degrees at the junction 88 of the exterior faces of the upper and rear plates 74 and 80 and then, at their outboard ends, has a bend 90 which turns inwardly and rearwardly at an angle of greater than ninety (90) degrees to provide contact surfaces 92 for the key leads. The grooves and spacers extend around the corner of the leading edge of the upper plate along the lower surface 94 thereof. In this manner, each of the receptacle leads is received along the majority of its extent in grooves for guiding its motion when being deflected by the leads of a key 14. The receptacle 12 itself may be utilized independent of the face plate 56 in embodiments where the key takes a configuration other than the rectangular profile as shown in FIGS. 1, 2, 6, 13, etc. Consider the key-shape profile of FIG. 16.

The Key

The key 14 itself is most clearly seen in FIGS. 1, 2 and 8 through 12. The key 14 is formed of two (2) flat, electrically insulating, mating key bodies 98 and 100 of similar configurations. The lower key body 98, however, unlike the upper key body 100, is formed with a plurality of holes 102 around its periphery. The upper key body has mating posts 104 around its periphery for coupling together the key halves 98 and 100.

The key 14 is provided with internally projecting slots 108 along its free leading edge 110 which are received by the vertical spacers 78 of the face plate 60. Between the slots 108 is the leading edge, slightly recessed from the remainder of the leading edge 30 of the key, for supporting the leads of the key. Also located in the key 14 adjacent the leading edge 30 is a first well 114 for receiving the power or source or battery 18. A second well 116 is located intermediate the leading edge 30 and the first well 114 for receiving the integrated circuit component 16 or chip. The component 16 contains the digital information to read or to be read or modified by the electronic machine. The leads 118 of the component are thus held in a common plane 120, at the interface of the body halves 98 and 100, which plane includes the leads at the free edge of the key 14 as well as the leads of the battery 18. All contact points for the leads thus lie in a common fabrication plane for ease of manufacturing and coupling of the electrical elements, i.e., component, battery and leads.

The front portion of the lower body half 98 is thicker than the rear half. This allows for the accommodation of the wells 114 and 116 as well as the battery 18 and component 16 in an inverted orientation. The front portion of the upper body half 100 is thinner than the rear half. The halves together thus constitute the thinnest, simplest housing for the elements of the smart key.

The preferred battery 18 is a flat, circular device with one of the poles or nodes 122 located at the center and the other pole or node 124 radially exterior of the vertical battery axis on the battery periphery. The central or positive node 122 is coupled by a battery lead 126 from the center of the upper face of the battery, in the fabrication plane 120, to the inboard end of an appropriate component lead 118. The negative battery lead 128 is coupled from the edge of the lower face of the battery and extends up a ramp 130 from the battery well 114, to the inboard end of an appropriate edge lead of the component. The battery leads 126 and 128 are permanently coupled to the battery 18 prior to battery installation in any conventional manner.

The last internal elements of the key 14 are the key leads 20, 22, 24, 26 and 28. The key leads are preferably fabricated on a common lead frame with additional material for ease of handling during fabrication. The lead frame is then positioned in a proper orientation adjacent the key 14 and then cut to remove the extraneous lead frame material. The extraneous lead frame material is then reprocessed for use in fabrication of additional lead frames.

The leading edge 30 of the key 14 has a forwardly extending part 136 for the ground lead 20 which also extends forwardly. This allows the making of the ground contact prior to the other contacts. It also allows the ground contact prior to the other contacts. It also allows the ground contact to hold for an extended time during card withdrawal.

Materials

The entire lead frame is preferably fabricated of a solid, unplated, resilient, electrically conductive, metallic material which exhibits self-limiting corrosive oxidation or slow corrosive oxidation. Regardless of the material selected for the key leads and receptacle leads, the same materials are preferably utilized in the leads for the receptacle.

Prior art smart keys and receptacles, as well as other devices with separable electrical contacts, as for example telephone jacks, computer circuit boards, and the like are designed for limited insertion and withdrawal life. Telephone jacks, for example, are rated for 750 cycles. Computer circuit boards with edge contacts normally experience even less insertions and removals over their lives. In addition, the environmental variations that they encountered are normally limited to variations in temperatures which are determinable. Once coupled, a telephone jack or computer circuit board remains coupled for a long period of time.

The present key is designed and intended for an extended life, as for example 50,000 cycles, with the ability withstand a very wide variety of types of contaminants. Such contaminants might include, for example, a holder's perspiration, dirt, sand from the beach, rainwater, sauces from the kitchen, etc., anything that one's house key or car key might encounter. Due to such difference in operating conditions, the present invention utilizes solid non-plated contacts rather than the contacts of the prior art. Solid contacts, however, are only operable so long as adequately high normal forces are generated between the contacts of the receptacle and the key to effectively scrape through the contaminants which may be encountered.

Bronzes, which are copper alloyed with tin, are presently used as the base material for contacts in the telephone jacks and computer circuit boards. The plating material is normally gold or tin. A limitation of plated contacts is that the plating layers are worn away after a number of insertion and withdrawal cycles, significantly lower than the anticipated usage of the present key.

Known systems simply do not and cannot generate enough normal force to cut through the corrosion and other contaminants which are generated by the present system. The present system generates about 200 grams of normal force. The contact material of the leads of the present invention is preferably formed with a cross section of about 0.020 inches by 0.020 inches, significantly larger than known systems. Such non-plated contacts also increase the life of the system and are less expensive than plated contacts.

In the present system the coupling contacts are normally disengaged. As a result, the corrosion of conventional materials would continue freely at its normal non-reduced rate during disengagement of the contacts, which would eventually interfere with the making of electrical contact on engagement. Because of these characteristic of known material, it is necessary to utilize a new material which will modify the oxidation process through time during disengagement of the contacts. The contact material of the present system does not directly limit corrosion. It effects its desired results by using either a self limiting or non-corrosive material. Platinum, palladium and gold are typical of such materials. Such materials, however, are extremely expensive and scrape readily during insertion and withdrawal.

One material that has been found preferable is an uncoated Olin 638. Olin 638 is a trademark of the Olin Corporation of Stamford, Conn. Olin 638 is a bronze alloy nominally containing 95.0% copper, 1.8% silicon, 2.8% aluminum and 0.4 % cobalt. This alloy contains a minimum of 93.0-% copper, 2.5 to 3.5% aluminum,, 1.5 to 2.1% silicon and 0.25 to 0.55 cobalt. It is characterized by self-limiting oxidation whereby its surface interacts with the oxygen of the atmosphere to form a self limiting film which acts to seal off the surface of the alloy from further oxidation and corrosion. The sealing off is effected by a thin layer of brittle material which is readily shattered and removed from the contacts upon insertion and removal of the key to thereby ensure good electrical coupling of the coupled contacts. The preferred properties for the leads of this invention are thus resilience, self-limiting corrosion or oxidation, long life, extended ability to recycle through insertion and withdrawal, etc. Alternatively, spinodal alloys could be used.

In using a key for the present types of application, a user can comfortably insert the key with four or five pounds of force from his hand. Normal force is the downward force of the receptacle contacts on the key contacts. Dividing the total normal force of two to three pounds among one half the limited number of contact points, six (6), a normal force of about one half pound per contact is effected. This has been found to be far more force than is necessary for the intended scraping function of contact cleaning in the present invention. Excessively high normal forces would overly burden the material. The present invention preferably utilizes about a half of a pound (200 grams) per contact. If the normal force were kept the same and the number of contacts doubled, the insertion force would double. In the present system, twice the normal forces are generated per contact over conventional systems of this type to insure proper lead cleaning and electrical contact.

Alternate embodiments

Figures 7A, 7B:
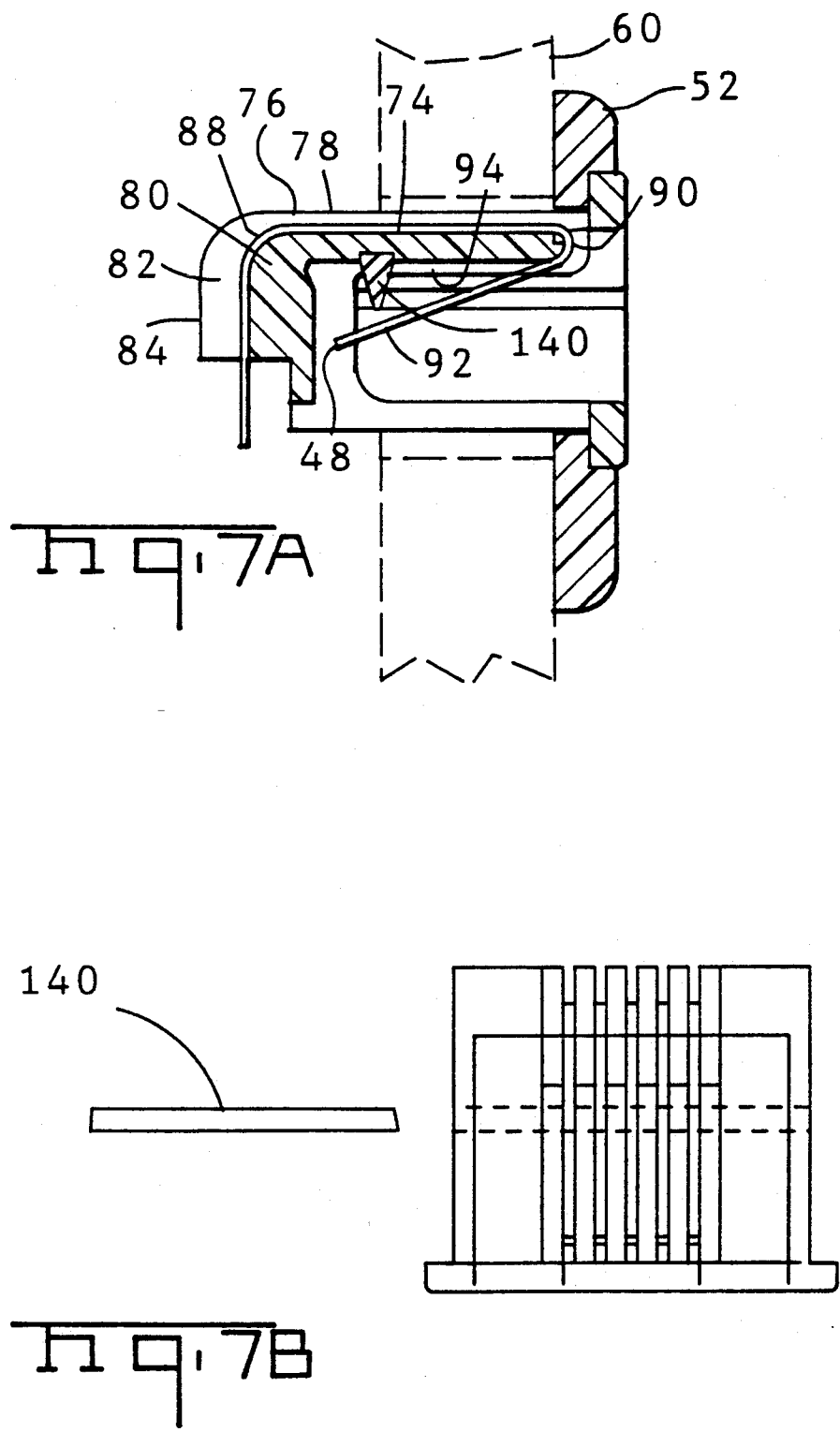
FIGS. 7A and 7B show certain internal constructions, of an alternate form of a receptacle.
Figure 12A:
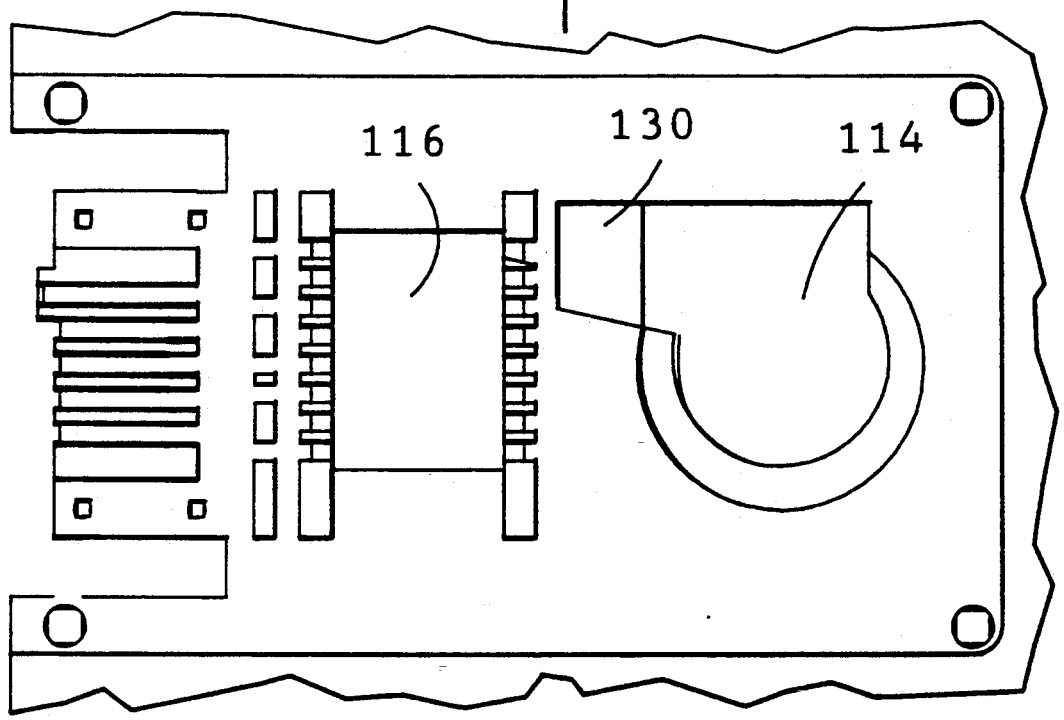
FIGS. 12A and 12B are plan views of the base and cover of the key of FIGS. 8–11 but with the electrical components removed.
Figure 12B:
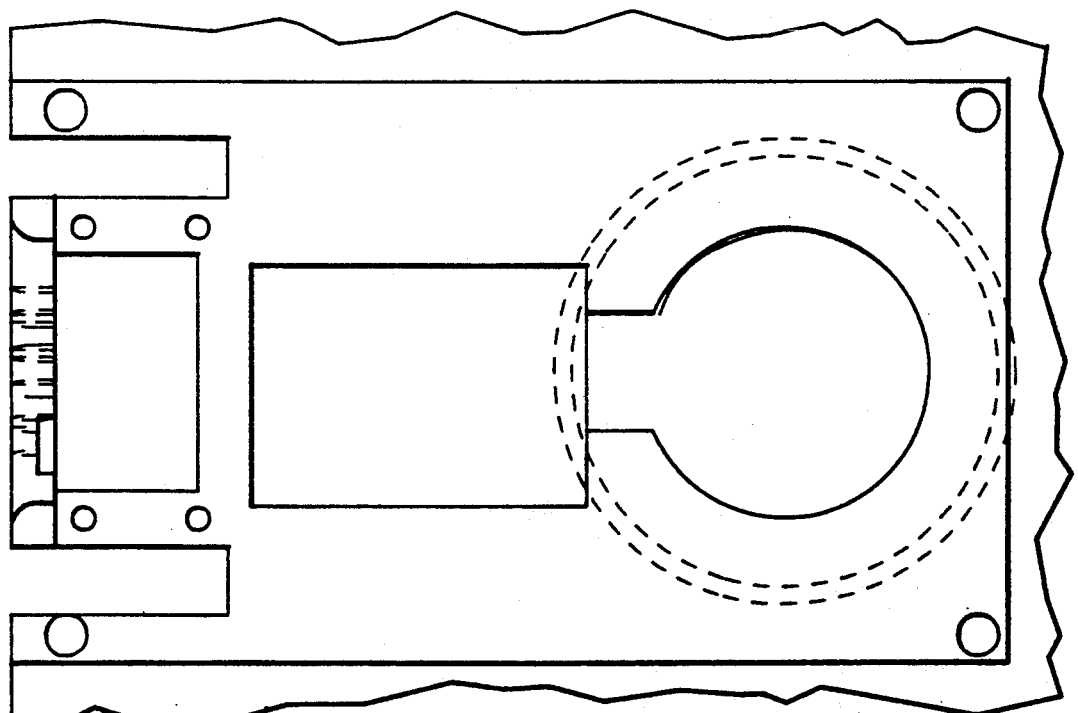

In an alternate form of the invention shown in FIGS. 7A and 7B, a triangular block 140 of resilient material, as for example, natural rubber or urethane is positioned above the leads 34, 36, 38, 40 and 42 of the receptacle 54' adjacent to the inwardly extending free ends 48 and beneath the upper plate 74. The block 140 functions to retain the receptacle leads in their lower positions as when no key is inserted. It also functions to generate the intended normal force when a key is inserted. In this manner, the leads of the receptacle may be designed, engineered and manufactured simply for their electrical characteristics independent of their resilience characteristics. This is because the resilience function of the leads is accommodated by the resilient block.

In a further embodiment of the invention shown in FIGS. 13-15, the key 144 is fabricated as described with respect to the first embodiment except that the battery leads 126 and 128 are not formed as permanent parts of the battery but rather as sections of the lead frame 146. The ramp 130 of the battery well 114 may thus be eliminated. In this embodiment, the lead frame 146 is fabricated as described above except that additional components are utilized as shown in FIGS. 13 through 15. Such further embodiment includes the two battery leads 150 and 152, both of which are located in the common fabrication plane. Inwardly directed resilient retaining fingers 154 and 156 are also formed as part of the lead frame. The retaining fingers are formed as down-turned, then up-turned lead extensions 160, in frictional contact with the sides of the battery 162 to retain it within the battery well. The lead frame immediately following fabrication is shown in FIG. 14. FIG. 13 shows its placement on the lower key body 164. The upper key body would be of essentially the same construction but with posts for coupling with the lower half regardless of the embodiment employed.

Electrical separation of the lead frame is required adjacent its rear most edge 166 to electrically separate the battery leads. This is effected during installation by shearing and down turning tabs 168 into recesses in the lower body half 164. Also during installation, a tab 172 is down turned into a central recess for stability in coupling the lead frame and key body. The shearing and bending is preferably done with a ram-like installation tool, not shown, with the recess edges of the key functioning as its anvil.

In yet a further embodiment of the invention the rectangular shaped key as previously discussed is replaced by key-shaped, rather than rectangular shaped, upper and lower key body halves 178 containing the same operating components as in the above-described embodiments. Note FIG. 16. A central aperture 182 is provided therethrough for coupling to a key ring.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A system for handling variable digital information comprising:

a key having a leading edge at one end thereof and a longitudinal axis along the length thereof, an active integrated circuit component, a DC battery for powering the component, leads extending between the component and the battery, unplated leads fabricated of an alloy containing at least 93 percent copper and including male contacts extending from the component parallel with the axis, the male contacts having upper contact surfaces located in a plane of contact, the unplated leads being down turned at the leading edge of the key;

a container for sealing the component, battery and leads except adjacent to the leading edge of the key;

a receptacle having a longitudinal axis along the length thereof parallel with the axis of the key, the receptacle also having plurality of unplated leads with inboard portions couplable to electronic machinery and with outboard portions having lower contact surfaces slidingly, resiliently contactable with the upper contact surfaces of the unplated leads of the key adjacent to the leading edge of the key; and resilient means adjacent to the outboard portions to urge the lower contact surfaces of the receptacle downwardly toward the plane of contact into sliding, resilient contact with the upper contact surfaces of the key whereby, when the key is moved along its axis into sliding contact with the leading portions of the receptacle, high normal forces are generated therebetween to break corrosion existing on the contacting surfaces thereof.

2. The system as set forth in claim 1 wherein the edge leads of the key, as well as the contacts between the battery and the component, are in a common plane.

3. The system as set forth in claim 1 wherein the alloy includes aluminum, silicon and cobalt.

4. The system as set forth in claim 3 wherein the leads of both the key and receptacle are fabricated of an alloy containing at least 93.0% copper, 2.5 to 3.5% aluminum, 1.5 to 2.1% silicon and 2.5 to 0.55% cobalt.

5. The system as set forth in claim 1 wherein the high normal forces are at least about 200 grams.

6. A system for handling variable digital information comprising:

a key having a leading edge at one end thereof and a longitudinal axis along the length thereof, an active integrated circuit component, a DC battery for powering the component, leads extending between the component and the battery, unplated leads including male contacts extending from the component parallel with the axis, the male contacts having upper contact surfaces located in a plane of contact, the unplated leads being down turned at the leading edge of the key;

a container for sealing the component, battery and leads except adjacent to the leading edge of the key;

a receptacle having a longitudinal axis along the length thereof parallel with the axis of the key, the receptacle also having plurality of unplated leads with inboard portions couplable to electronic machinery and with outboard portions having lower contact surfaces slidingly, resiliently contactable with the upper contact surfaces of the unplated leads of the key adjacent to the leading edge of the key; and resilient means in the form of a block positioned in contact with the sides of the outboard portions remote from the leads of the key to urge the lower contact surfaces of the receptacle downwardly toward the plane of contact into sliding, resilient contact with the upper contact surfaces of the key whereby, when the key is moved along its axis into sliding contact with the leading portions of the receptacle, high normal forces are generated therebetween to break corrosion existing on the contacting surfaces thereof.

7. The system as set forth in claim 6 wherein the leads of the receptacle are of a solid, resilient, copper-based alloy which exhibits self-limiting corrosion, unplated at their ends.

8. A system for handling variable digital information comprising:
- a key having a leading edge at one end thereof and a longitudinal axis along the length thereof, an active integrated circuit component, a DC battery for powering the component, leads extending between the component and the battery, unplated leads including male contacts extending from the component parallel with the axis, the male contacts having upper contact surfaces located in a plane of contact, the unplated leads being down turned at the leading edge of the key with one of the unplated leads extending forwardly of others of the unplated leads for the initial grounding of the card;
- a container for sealing the component, battery and leads except adjacent to the leading edge of the key;
- a receptacle having a longitudinal axis along the length thereof parallel with the axis of the key, the receptacle also having a plurality of unplated leads with inboard portions couplable to electronic machinery and with outboard portions having lower contact surfaces slidingly, resiliently contactable with the upper contact surfaces of the unplated leads of the key adjacent to the leading edge of the key; and
- resilient means adjacent to the outboard portions to urge the lower contact surfaces of the receptacle downwardly toward the plane of contact into sliding, resilient contact with the upper contact surfaces of the key whereby, when the key is moved along its axis into sliding contact with the leading portions of the receptacle, high normal forces are generated therebetween to break corrosion existing on the contacting surfaces thereof.

* * * * *

UNITED STATES PATENT AND TRADEMARK OFFICE
CERTIFICATE OF CORRECTION

PATENT NO.   : 5,157,244

DATED        : October 20, 1992

INVENTOR(S)  : Robert S. Mroczkowski, et al.

It is certified that error appears in the above-identified patent and that said Letters Patent is hereby corrected as shown below:

Column 10:
In claim 4, line 4, "2.5" should read --0.25--.

Column 10:
In claim 6, line 18, after "having" should be inserted --a--.

Column 11:
In claim 8, line 14, "card" should read --key--.

In column 3, line 46, change "2.5%" to read --0.25%--.

In column 8, line 16, after "uncoated" insert --Copper Alloy No. 638 such as--.

In column 8, line 20, in "93.0-%" delete hyphen, and delete second comma.

In column 8, line 21, after "0.55" insert --%--.

Signed and Sealed this

Twenty-sixth Day of April, 1994

Attest:

*Attesting Officer*

BRUCE LEHMAN

*Commissioner of Patents and Trademarks*